United States Patent [19]

Kennel

[11] Patent Number: 4,755,350
[45] Date of Patent: Jul. 5, 1988

[54] THERMIONIC REACTOR MODULE WITH THERMAL STORAGE RESERVOIR

[75] Inventor: Elliot B. Kennel, Dayton, Ohio

[73] Assignee: The United States of America as represented by the Secretary of the Air Force, Washington, D.C.

[21] Appl. No.: 24,447

[22] Filed: Mar. 11, 1987

[51] Int. Cl.[4] .............................................. G21C 3/40
[52] U.S. Cl. .................................... 376/321; 136/202;
310/301; 376/367; 376/904
[58] Field of Search .......................... 136/202; 310/301;
376/321, 904, 367

[56] References Cited

U.S. PATENT DOCUMENTS

| 3,088,988 | 5/1963 | Menke | 136/4 |
| 3,362,853 | 1/1968 | Valdsaar | 136/205 |
| 3,452,423 | 7/1969 | Webb | 29/472.9 |
| 3,496,026 | 2/1970 | Mayo | 136/202 |
| 3,623,947 | 11/1971 | Hobson et al. | 376/321 |
| 3,709,781 | 1/1973 | Fiebelmann et al. | 376/321 |
| 3,931,532 | 1/1976 | Byrd | 310/4 |
| 3,989,546 | 11/1976 | Purdy et al. | 136/202 |

OTHER PUBLICATIONS

Anderson et al., Nuclear Applications, No. 6, vol. 5, Dec. 1968, pp. 424–436.
Koenig, 11th Intersociety Energy Conversion Engineering Conference, State Line, Nev., U.S.A. (Sep. 12–17, 1976).

Primary Examiner—Deborah L. Kyle
Assistant Examiner—Richard Wendtland
Attorney, Agent, or Firm—Fredric L. Sinder; Donald J. Singer

[57] ABSTRACT

A thermionic energy conversion system assembly is described which comprises a fissionable nuclear fuel which surrounds a cylindrical arrangement of thermionic emitter electrodes which surround corresponding collector electrodes, which in turn surround a cylindrical container of a heat sink material, such as lithium hydride, which can absorb large amounts of waste heat energy through a phase change. The heat sink material may also act as a nuclear moderator to reduce the amount of required nuclear fuel. A heat pipe is enclosed within the container of heat sink material to remove waste heat stored in the material. A thermionic energy conversion module is described which comprises 100 stacked-in-series thermionic converter assemblies. A complete space-based thermionic nuclear reactor is described which comprises an array of 91 thermionic converter modules wherein the heat pipes connect to a lithium hydride radiation shield which acts as a further heat sink. The radiation shield connects to radiators to remove the waste heat to space.

15 Claims, 2 Drawing Sheets

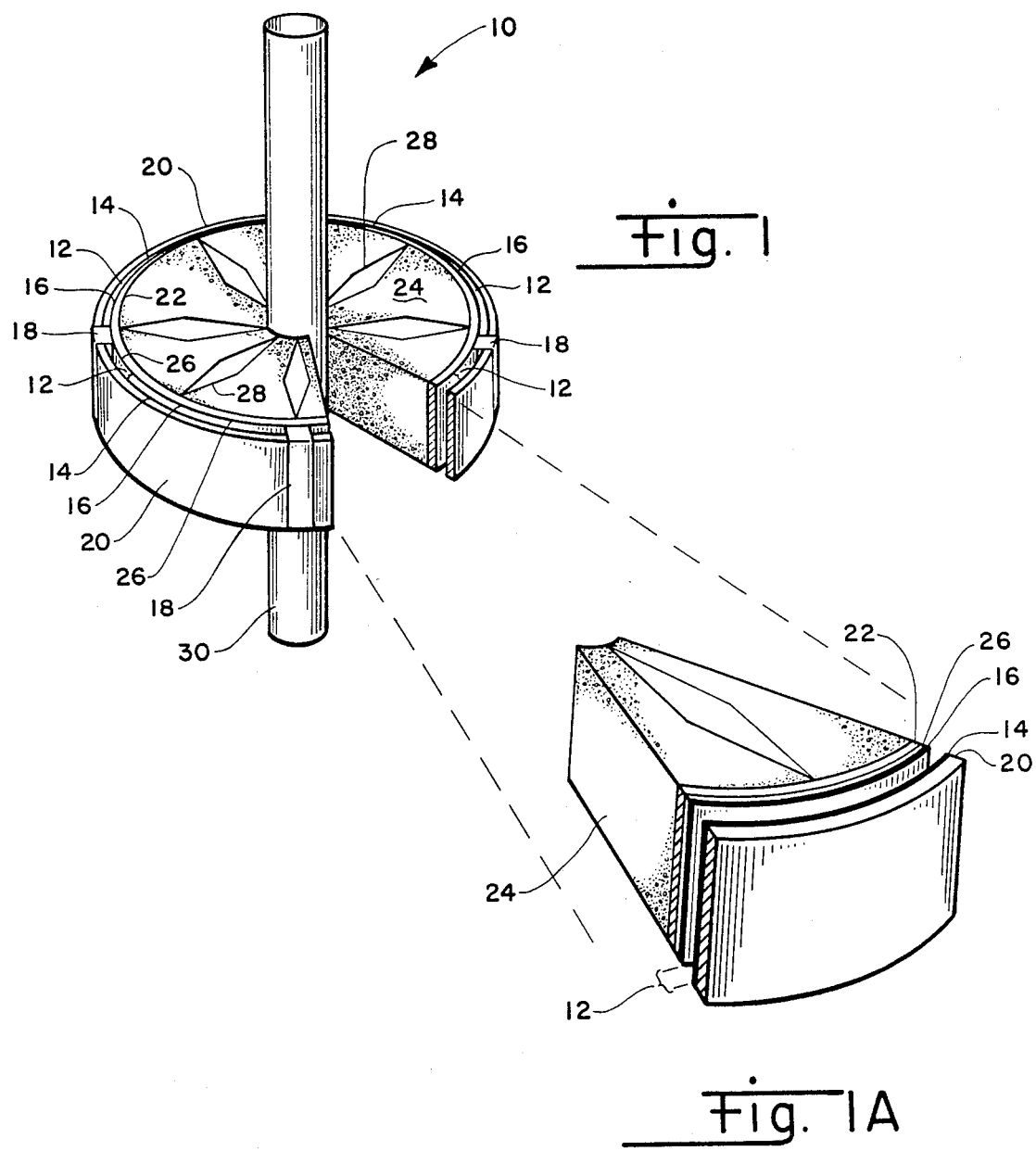

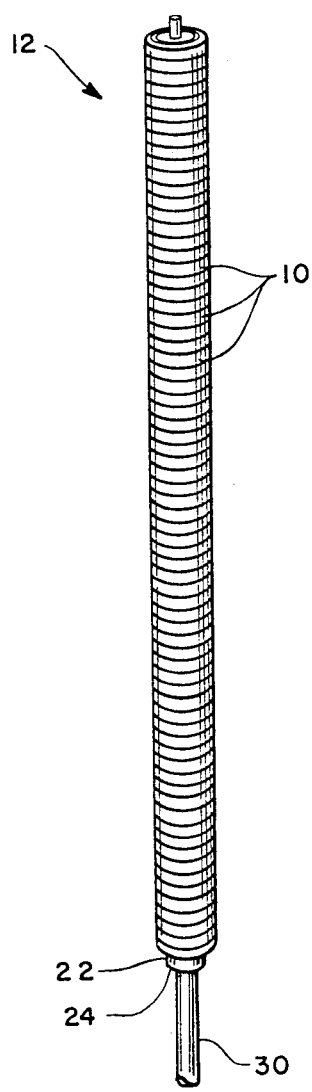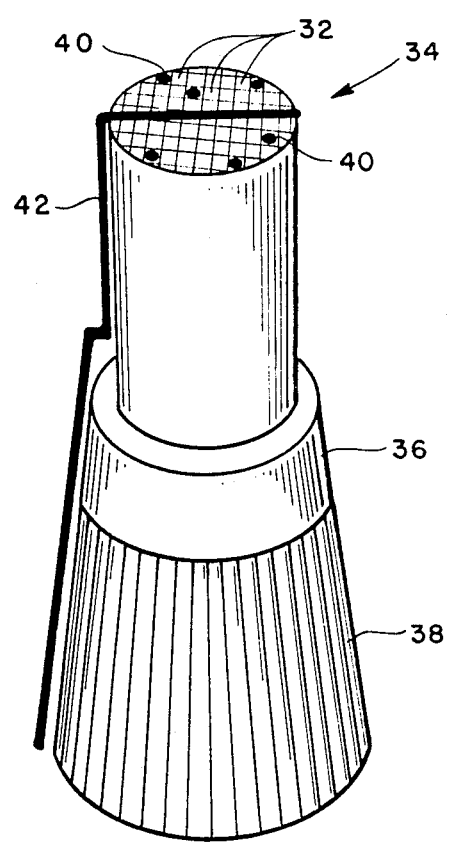

THERMIONIC REACTOR MODULE WITH THERMAL STORAGE RESERVOIR

RIGHTS OF THE GOVERNMENT

The invention described herein may be manufactured and used by or for the Government of the United States for all governmental purposes without the payment of any royalty.

BACKGROUND OF THE INVENTION

The present invention relates generally to thermionic power conversion systems, and more specifically to modules for a nuclear energy powered thermionic reactor for space-based operation capable of providing large amounts of power in short pulses.

In the operation of a thermionic converter, heat energy is converted directly to electrical current by heating a metallic emitter to sufficiently high temperatures so that electrons escape the emitter and flow to a cooler collector. The source of heat energy for conversion to electrical current may be any of several types, including exothermic chemical reactions and the heat of nuclear fission. In order to promote efficient operation of a thermionic system to generate useful amounts of electrical power, the system must not only generate large amounts of heat required for energizing the thermionic components, but must also provide for rejection of waste heat from the cold side of the thermionics.

High power thermionic energy systems are proposed as power supplies for space-based beam or kinetic energy weapons. Those devices require substantial power, but only for short bursts. It is seen, therefore, that there is a need for a thermionic power system able to rapidly absorb very large amounts of waste heat during a high output power pulse, and then remove the absorbed waste heat energy to prepare for another pulsed output of power.

It is, therefore, a principal object of the present invention to provide an efficient high power thermionic power system particularly adaptable to high powered pulsed operations in space.

It is another object of the present invention to provide a nuclear fission powered thermionic system.

These and other objects of the present invention are achieved by the following described nuclear energy powered thermionic reactor system. A unique discovery of the present invention is the use of a heat sink material contained within the core of each reactor module to absorb the waste heat of the thermionic conversion process.

An advantage of the present invention is that the heat sink material may act as a neutron moderator, thereby reducing the amount of needed nuclear fuel.

A further advantage of the present invention is that containing the heat sink material within the reactor core eliminates any need for an intermediate heat exchanger.

Yet another advantage of the present invention is that the reactor radiation shield may be used as part of a heat sink for cooling the heat sink material in the reactor core.

The reactor, unlike open-cycle turbine generators, emits no effluents, thereby avoiding problems with thrust cancellation, contamination, and so forth. Also unlike open-cycle power supplies, the reactor is completely reusable. Further, the reactor has no moving parts, eliminating any need in a space based system for torque cancellation and reducing or eliminating vibration.

SUMMARY OF THE INVENTION

The present invention is directed to a thermionic energy conversion system assembly comprising a heat source which surrounds a plurality of emitter electrodes which surround a plurality of corresponding collector electrodes which in turn surround a heat sink. The heat source may be fissionable nuclear fuel. The heat sink may be a container of heat sink material, which may be a lithium salt, such as lithium hydride. The heat sink material may also be a neutron moderator, such as lithium hydride enriched in the Li-7 isotope.

The invention additionally includes a heat pipe, enclosed in the heat sink material, for transferring heat out of the heat sink material.

The invention further includes a thermionic energy conversion system module comprising a plurality of stacked-in-series thermionic conversion assemblies. The heat sources and the heat sinks may be made continuous from one assembly to another, and a heat pipe enclosed in the heat sink material removes heat from the heat sink material.

The invention further includes an array of thermionic energy conversion system modules to form a thermionic nuclear reactor.

The invention additionally includes the method of thermionic energy conversion by using a heat sink positioned inside the thermionic converter assembly.

DESCRIPTION OF THE DRAWINGS

The present invention will be more clearly understood from a reading of the following detailed description in conjunction with the accompanying drawings wherein:

FIG. 1 is a perspective view of an assembly of four thermionic converters incorporating the teachings of the present invention;

FIG. 1A is a perspective view of a wedge section of FIG. 1 removed to show more detail.

FIG. 2 is a perspective view of a thermionic reactor module comprising approximately 100 thermionic converter assemblies stacked in series; and, FIG. 3 is a representative perspective view of a space-based nuclear reactor system based upon the present invention.

DETAILED DESCRIPTION

Referring now to FIGS. 1 and 1A of the drawings, there is shown a perspective view of an assembly 10 of four semi-circular thermionic converters 12 wired in parallel, and a wedge section of assembly 10 removed to show more detail. Each thermionic converter 12 comprises an outer emitter electrode 14, separated at a fixed distance from an inner collector electrode 16 by insulated spacers and expansion joints 18. Spacers 18 include the connections for the parallel wiring of thermionic converters 12. Assembly 10 includes an outer layer of nuclear fuel 20, and an enclosed container 22 containing a core of heat sink material 24. Container 22 is electrically insulated from collectors 16 by an insulating coating 26. Voids 28 are allowed to form inside the core of heat sink material 24 to provide for expansion. Heat stored in heat sink material 24 is removed by an enclosed heat pipe 30.

FIG. 2 is a perspective view of a thermionic reactor module 32 comprising approximately 100 thermionic converter assemblies 10 stacked in series. Each assembly 10 is electrically distinct from other assemblies 10 on either side. Container 22 and the core of heat sink material 24 extend unbrokenly through module 10 and to form a thermal reservoir for the reactor module. Heat from nuclear fuel 20 is applied to the outside of the emitters 14 to produce an electric current from emitters 14 to collectors 16. Waste heat is stored in the thermal reservoir comprising container 22 and the core of heat sink material 24 and is slowly removed by heat pipe 28.

FIG. 3 is a representative perspective view of a space based nuclear reactor system 34 comprising an array of ninety-one modules 32. Heat pipes 28, as shown in FIGS. 1 and 2, but hidden in this figure, connect to an lithium hydride (LiH) radiation shield 36, which serves as a further heat sink and is connected to radiator 38 which ultimately transfers the waste heat to space. Control rods 40 are variously located between individual modules 32 of the array to moderate the fission producing neutron flux between modules 32. Bus bar 42 provides a common current path for the connected upper terminals of modules 32.

In a space based system, emitter electrodes 14 are preferably made of a material such as molybdenum. The collector electrodes 16 are also preferably made of molybdenum, or similar material such as niobium. Spacers 18 are preferably made of materials such as aluminum oxide or yttrium oxide. Nuclear fuel 20 will typically be uranium carbide. Container 22 preferably is made of stainless steel or titanium and is insulated from collectors 16 by insulating coating 26 preferably made of $Al_2O_3$ or $TiO_x$. The possible heat sink materials 24 include ice, lithium or similar materials that will absorb a large amount of energy through a phase change, and preferably are a lithium salt, particularly lithium hydride. These materials are particularly suitable in a nuclear fission powered reactor because they act as neutron moderators (the lithium when enriched in the Li-7 isotope), moderating the energy of neutrons passing through them, and increasing the number of neutrons of lower energy levels able to create new fission chain reactions.

Calculations indicate that as much as 8 megajoules/Kg of thermal energy may be stored in LiH. This permits a hexagonal array of ninety-one modules 32, as shown in FIG. 3, to produce 25 megawatts of electric power for 450 seconds with a total system weight of approximately 20,000 kilograms. The reactor will regain about 50 percent of its capacity in one orbit of 90 to 120 minutes. Each container 22 of heat sink material 24 is approximately 3.0 m in length with an outer diameter of 20 cm. The inner diameter of thermionic converters 12 is a corresponding 20 cm. Each electrode 14 and 16 is 2.6 mm thick with an interelectrode gap distance of 0.3 mm. The neutron absorbing property of the lithium hydride heat sink material 24 permits the thickness of the uranium fuel layer 20 to be 1 mm or less for a ninety-one module array. The overall length of nuclear reactor 34 is 7–8 m and the diameter 2.5–3.5 m.

The disclosed method of making the nuclear powered thermionic reactor successfully demonstrates the use and advantages of placing the emitter electrode on the outside and containing a heat sink material inside the thermionic converter. Though the disclosed use is specialized, it will find application in other areas of energy generation where the advantages of a self-contained system are required.

The disclosed embodiment of a nuclear energy powered thermionic reactor uses an array of modules of stacked thermionic assemblies. Those with skill in the art will see that individual assemblies made with single instead of multiple thermionic converters are generally equivalent structures and may provide different desired operating characteristics. Similarly, the individual assemblies are shown as generally cylindrical concentric structures. Those with skill in the art will see that any other structure wherein the heat sink is generally enclosed by, respectively, a collector and an emitter, such as concentric spheres or other shapes, is equivalent. In a spherical design, the heat pipe for removal of heat from heat sink material 24 becomes a more critical element. Those with skill in the art will see also that the use of a combination heat source and emitter, such as an alloy of metal and uranium carbide, will result in an equivalent structure. Also, reactor modules 32 are described as a stacked series of discrete assemblies, similar to cells in a battery, with heat sink material 24 and nuclear fuel 20 being continous from assembly to assembly in an assembled module. Other advantages may be found in modules having a different and more continous arrangement of emitters and collectors. It is understood that other modifications to the invention as described may be made, as might occur to one with skill in the field of the invention, within the intended scope of the claims. Therefore, all embodiments contemplated have not been shown in complete detail. Other embodiments may be developed without departing from the spirit of the invention or from the scope of the claims.

I claim:

1. A thermionic energy conversion system assembly, comprising:
   (a) a source of heat;
   (b) a plurality of emitter electrodes thermally coupled to and generally enclosed by the source of heat;
   (c) a plurality of collector electrodes in a spaced relationship from and generally enclosed by the emitter electrodes; and,
   (d) a heat sink generally enclosed by the collector electrodes.

2. A thermionic energy conversion system assembly according to claim 1, wherein the source of heat comprises fissionable material.

3. A thermionic energy conversion system assembly according to claim 1, wherein the heat sink comprises a container of heat sink material.

4. A thermionic energy conversion system assembly comprising:
   (a) a source of heat;
   (b) a plurality of emitter electrodes thermally coupled to and generally enclosed by the source of heat;
   (c) a plurality of collector electrodes in a spaced relationship from and generally enclosed by the emitter electrodes;
   (d) a heat sink generally enclosed by the collector electrodes;
   (e) wherein the heat sink comprises a container of heat sink material; and,
   (f) wherein the heat sink material comprises a lithium salt.

5. A thermionic energy conversion system assembly according to claim 4, wherein the lithium salt comprises lithium hydride.

6. A thermionic energy conversion system assembly comprising:
   (a) a shource of heat;

(b) a plurality of emitter electrodes thermally coupled to and generally enclosed by the source of heat;

(c) a plurality of collector electrodes in a spaced relationship from and generally enclosed by the emitter electrodes;

(d) a heat sink generally enclosed by the collector electrodes;

(e) wherein the heat sink comprises a container of heat sink material; and, (f) wherein the heat sink material comprises a neutron moderator.

7. A thermionic energy conversion system assembly according to claim 6, wherein the heat sink material comprises lithium hydride enriched in the Li-7 isotope.

8. A thermionic energy conversion system assembly according to claim 3, further comprising a heat pipe, enclosed generally within the heat sink material, for transferring heat out of the heat sink material.

9. A thermionic energy conversion system module, comprising a plurality of stacked thermionic conversion system assemblies, each assembly comprising:

(a) a source of heat;

(b) a plurality of emitter electrodes thermally coupled to and generally enclosed by the source of heat;

(c) a plurality of collector electrodes in a spaced relationship from and generally enclosed by the emitter electrodes; and, (d) a heat sink generally enclosed by the collector electrodes.

10. A thermionic energy conversion system module according to claim 9, wherein the heat sinks are generally continuous from assembly to assembly.

11. A thermionic energy conversion system module according to claim 10, wherein the heat sinks comprise a container of heat sink material, and further comprise a heat pipe, enclosed generally within the heat sink material, for transferring heat out of the heat sink material.

12. A thermionic nuclear reactor, comprising an array of thermionic energy conversion system modules, each module comprising a plurality of stacked thermionic conversion system assemblies, each assembly comprising:

(a) a source of heat;

(b) a plurality of emitter electrodes thermally coupled to and generally enclosed by the source of heat;

(c) a plurality of collector electrodes in a spaced relationship from and generally enclosed by the emitter electrodes; and, (d) a heat sink generally enclosed by the collector electrodes.

13. A thermionic nuclear reactor according to claim 12, wherein each heat sink comprises a container of heat sink material, and each module further comprises a heat pipe, enclosed generally within the heat sink material, for transferring heat out of the heat sink material.

14. A method of converting heat energy to electrical energy, comprising the steps of:

(a) providing a source of heat;

(b) thermally coupling the heat source to a plurality of emitter electrodes generally enclosed by the source of heat;

(c) providing a plurality of collector electrodes in a spaced relationship from and generally enclosed by the emitter electrodes; and (d) thermally coupling the collector electrodes to a heat sink generally enclosed by the collector electrodes.

15. The method of converting heat energy to electrical energy according to claim 14, further comprising the step of removing heat from the heat sink with a heat pipe.

* * * * *